(12) United States Patent
Nelson et al.

(10) Patent No.: US 10,072,186 B2
(45) Date of Patent: Sep. 11, 2018

(54) FARNESENE-BASED TACKIFYING RESINS AND ADHESIVE COMPOSITIONS CONTAINING THE SAME

(71) Applicant: Fina Technology, Inc., Houston, TX (US)

(72) Inventors: Keith A. Nelson, Exton, PA (US); Anaïs Pierre-Justin, La Plaine Sant-Denis (FR); Nestor P. Hansen, Coatesville, PA (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 14/815,114

(22) Filed: Jul. 31, 2015

(65) Prior Publication Data
US 2017/0029668 A1 Feb. 2, 2017

(51) Int. Cl.
| | | |
|---|---|---|
| *C09J 7/20* | (2018.01) | |
| *C09J 11/08* | (2006.01) | |
| *C09J 153/02* | (2006.01) | |
| *C09J 109/06* | (2006.01) | |
| *C09J 115/00* | (2006.01) | |
| *C09J 121/00* | (2006.01) | |
| *C09J 147/00* | (2006.01) | |
| *C08L 21/00* | (2006.01) | |
| *C08F 236/22* | (2006.01) | |
| *C08F 36/22* | (2006.01) | |
| *C09J 7/38* | (2018.01) | |

(52) U.S. Cl.
CPC .............. *C09J 11/08* (2013.01); *C08F 36/22* (2013.01); *C08F 236/22* (2013.01); *C08L 21/00* (2013.01); *C09J 7/381* (2018.01); *C09J 109/06* (2013.01); *C09J 115/00* (2013.01); *C09J 121/00* (2013.01); *C09J 147/00* (2013.01); *C09J 153/02* (2013.01); *C09J 7/20* (2018.01); *C09J 2203/334* (2013.01); *C09J 2205/114* (2013.01); *C09J 2421/00* (2013.01); *C09J 2423/00* (2013.01); *C09J 2425/00* (2013.01); *C09J 2453/00* (2013.01); *C09J 2467/006* (2013.01); *C09J 2493/00* (2013.01)

(58) Field of Classification Search
None
See application file for complete search history.

(56) References Cited

U.S. PATENT DOCUMENTS

| | | |
|---|---|---|
| 2,754,288 A | 7/1956 | Banes et al. |
| 3,784,530 A | 1/1974 | Osborn et al. |
| 3,846,352 A | 11/1974 | Bullard et al. |
| 3,963,653 A | 6/1976 | Katayama et al. |
| 3,987,123 A | 10/1976 | Lepert |
| 4,011,178 A | 3/1977 | Muse |
| 4,130,701 A | 12/1978 | Lepert |
| 4,328,090 A | 5/1982 | Stuckey, Jr. et al. |
| 4,403,080 A | 9/1983 | Hughes |
| 4,514,554 A | 4/1985 | Hughes |
| 4,833,193 A * | 5/1989 | Sieverding .................. C09J 7/00 428/220 |
| 5,284,891 A * | 2/1994 | Wouters ................ C08F 240/00 524/522 |
| 5,814,685 A * | 9/1998 | Satake .................. C09D 11/326 347/100 |
| 6,552,118 B2 * | 4/2003 | Fujita ........................ C08F 8/42 106/287.1 |
| 6,558,790 B1 * | 5/2003 | Holguin ..................... C09J 4/00 428/317.1 |
| 6,900,274 B2 | 5/2005 | Ruckel |
| 7,070,051 B2 * | 7/2006 | Kanner ............ A61B 17/06133 206/382 |
| 7,618,705 B2 * | 11/2009 | Tabata ...................... B32B 7/12 428/355 BL |
| 7,655,739 B1 * | 2/2010 | McPhee .................. A61L 15/58 428/343 |
| 2012/0165474 A1 * | 6/2012 | McPhee .................. C08C 19/02 525/314 |
| 2015/0025193 A1 | 1/2015 | Doolan |

FOREIGN PATENT DOCUMENTS

| | | |
|---|---|---|
| EP | 0318217 | 5/1989 |
| EP | 0455105 | 11/1991 |
| EP | 1597333 | 11/2005 |
| EP | 2172529 | 4/2010 |
| JP | S63215787 | 9/1988 |
| JP | 2010215880 | 9/2010 |
| WO | WO 2013/126129 A1 | 8/2013 |

OTHER PUBLICATIONS

Excerpt from Handbook of Pressure-Sensitive Adhesives and Products: Technology of Pressure-Sensitive Adhesives and Products, CRC Press, ed. Benedek et al. (2009).*
Arizona Chemical Products, pp. 1-3 (2015).
Pinova-Product-Selection-Guide, pp. 1-6 (2005).
Stork and Burgstahier, J. Am. Chem. Soc., (77):5068-77 (1955).
English language International Search Report with Written Opinion of The International Searching Authority for PCT/US2016/043315,, dated Jan. 2, 2017, 19 pages.
Invitation to pay additional fees and, where applicable, protest fee and Communication relating to the results of the partial international search, dated Oct. 24, 2016, 7 pages.
International Preliminary Report on Patentability and Written Opinion for International Application No. PCT/US2016/043315, dated Feb. 6, 2018, 12 pages.

* cited by examiner

Primary Examiner — Frank D Ducheneaux
(74) Attorney, Agent, or Firm — Albert Shung

(57) ABSTRACT

A tackifying resin includes a farnesene-based polymer having monomeric units derived from a farnesene monomer and one or more optional comonomers selected from the group consisting of dienes, branched mono-olefins, and vinyl aromatics and has a softening point greater than or equal to 80 degrees Celsius. A method of making the farnesene-based polymer includes combining a farnesene monomer and a solvent and optionally adding one or more comonomers selected from the group consisting of dienes, branched mono-olefins, and vinyl aromatics, to provide a monomer feed, and polymerizing the monomer feed by combining the monomer feed with a Friedel-Crafts catalyst in a vessel. The tackifying resin may be combined with an elastomer to form a hot melt adhesive composition.

22 Claims, 16 Drawing Sheets

FARNESENE-BASED TACKIFYING RESINS AND ADHESIVE COMPOSITIONS CONTAINING THE SAME

FIELD OF THE INVENTION

The invention relates to adhesive compositions comprising a tackifying resin derived from a farnesene monomer. The tackifying resin comprises a low molecular weight farnesene-based homopolymer or copolymer prepared using a Friedel-Crafts catalyst and has a softening point greater than or equal to 80 degrees Celsius.

BACKGROUND

Adhesives, such as hot melt adhesives, typically exist as entirely solid materials which do not contain or require any solvents. They are solid materials at ambient room temperature, but can be converted to a liquid or fluid state by the application of heat, in which state they may be applied to a substrate. On cooling, the adhesive regains its solid form and gains its cohesive strength. In this regard, hot melt adhesives differ from other types of adhesives, such as water-based adhesives, which achieve the solid state by evaporation, removal of solvents, polymerization, or other means. Hot melt adhesives may be formulated to be relatively hard and free of tack or, in contrast, to be pressure sensitive, i.e., relatively soft and tacky at room temperature.

These adhesives are particularly useful in the manufacture of a variety of industrial or consumer goods where bonding of various substrates is necessary, such as labels for packages, tapes of all types, end of line case and carton assembly and closure adhesives, non-woven adhesives, wood adhesives, book-binding adhesives, etc. Other applications include wax modification and traffic stripping. An advantage of hot melt adhesives is the absence of a liquid carrier, as would be the case for water-based or solvent-based adhesives, which requires a drying step during application of the adhesive. Suitable hot melt adhesives possess the appropriate bond strength to adhere the substrates involved, and also demonstrate adequate flexibility, no staining or bleed through of the substrate, suitable viscosity and open time to function on a variety of substrates, acceptable stability under storage conditions, and acceptable thermal stability under normal application temperature.

Hot melt adhesive compositions typically employ tackifying resins having softening points of at least 80° C. C5 diolefins such as 1,3-pentadiene, commonly known as piperylene, are the basic feed stock for the production of cationically polymerized tackifying resins. Piperylene is produced as a by-product of the steam cracking process whereby petroleum liquids are processed for the primary purpose of production of ethylene. Other olefins and diolefins such as 2-methyl-1-butene, 2-methyl-2-butene, and dicyclopentadiene are also produced. Tackifying resins prepared from C5 olefins and diolefins are known in the industry as "aliphatic" resins while those prepared from C5 olefins and diolefins along with one or more vinyl aromatic monomers, e.g. styrene and alpha-methyl styrene, are known as "aromatic modified" resins.

Due to its increased availability, low-cost gas is displacing liquids as feed stock in the steam cracking process for the production of ethylene. The result is that lower amounts of C5 diolefins are being produced leading to a shortage of this monomer for the production of tackifying resins. There is therefore a need for alternative monomers for the augmentation or even complete displacement of current petroleum-based diolefins for the production of tackifying resins that are cost-effective and readily available. The alternative monomers should preferably produce a resin having low odor and initial color and have compatibility with the adhesive resins commonly used in the formulation of hot melt and pressure sensitive adhesive compositions among other desirable properties.

SUMMARY OF THE INVENTION

It is a first aspect of the present invention to provide a tackifying resin comprising a farnesene-based polymer. The farnesene-based polymer comprises monomeric units derived from a farnesene monomer and one or more optional comonomers selected from the group consisting of dienes, branched mono-olefins, and vinyl aromatics and has a softening point greater than or equal to 80 degrees Celsius.

It is a further aspect of the present invention to provide a method of making the tackifying resin comprising combining a farnesene monomer and a solvent and optionally adding one or more comonomers selected from the group consisting of dienes, branched mono-olefins, and vinyl aromatics, to provide a monomer feed, and polymerizing the monomer feed by combining the monomer feed with a Friedel-Crafts catalyst in a vessel.

It is yet another aspect of the present invention to provide an adhesive composition comprising an elastomer and a tackifying resin, wherein the tackifying resin comprises a polymer derived from monomers comprising farnesene and having a softening point greater than or equal to 80 degrees Celsius.

DETAILED DESCRIPTION OF THE INVENTION

Figure 1:
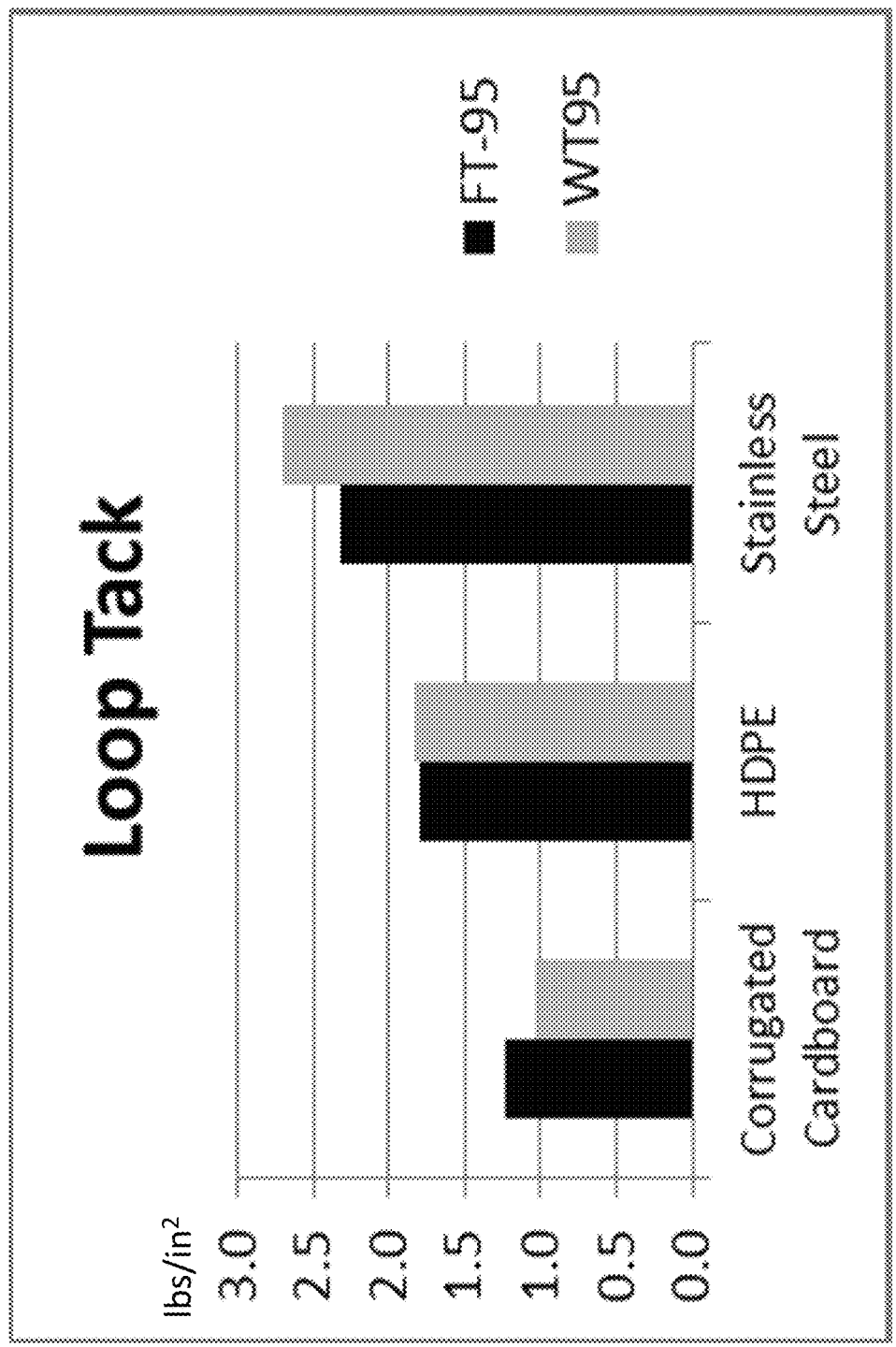
FIG. 1 is a Loop Tack graph comparing an adhesive composition according to a first embodiment of the present invention and a comparative adhesive composition containing a similar C5 tackifying resin.

It has been found that polymerizing a farnesene monomer according to the present invention by using a strong Lewis acid, such as a Friedel-Crafts catalyst, cyclization of the polymer competes with monomer addition and results in low molecular weight resin having a high softening point.

As used throughout the specification and the claims, "Friedel-Crafts catalyst" means a strong Lewis acid and the complexes thereof that function as a polymerization initiator. As used throughout the specification and the claims, "softening point" means the temperature at which a resin softens as determined according to ASTM D6090. As used throughout the specification and the claims, "polymer" means a compound which is the product of the polymerization of monomers having a degree of polymerization of 2 or greater.

Resins made according to the present invention differ from previous farnesene-based polymers in that the methods generally used to provide the previous polymer resins were either anionic or free radical polymerization, both of which lead to materials having low glass transition temperatures.

It is believed that the high softening points attained for piperylene-based tackifying resins are a consequence of the highly cyclic molecular structure that results from using a Friedel-Crafts catalyst as the polymerization initiator. The formation of cyclic structures in piperylene resins is believed to result from a "back biting" mechanism where the growing end of the resin molecule attacks a double bond in the same molecule.

While not wishing to be bound to theory, it is believed that the high softening points attained for the tackifying resins according to the present invention are a consequence of the highly cyclic molecular structures formed by farnesene monomer. Whereas the farnesene monomer may also form cyclic structures via a back-biting mechanism, it is also capable of forming additional cyclic structures via secondary reactions involving the double bonds of the pendant farnesene side chains.

For example, referring to FIG. 1 below, a polymerization reaction of the monomers farnesene and styrene using a Friedel-Crafts catalyst as the polymerization initiator likely causes intra-molecular reaction of the olefins in what would have been acyclic pendant side chains derived from the farnesene monomer. The cyclization illustrated below is one example of cyclization that may potentially occur for a copolymer of styrene and farnesene.

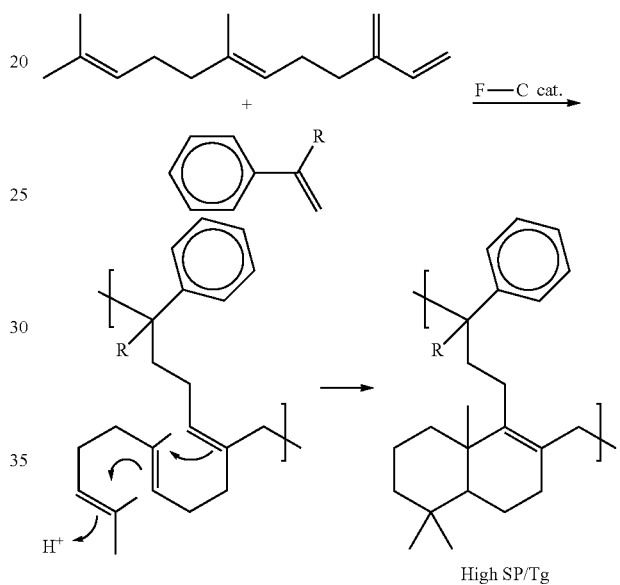

It is one aspect of the present invention to provide a hot melt or pressure sensitive adhesive composition comprising a tackifying resin derived from a farnesene monomer. The resin comprises a low molecular weight farnesene-based homopolymer or copolymer resin obtained by using a Friedel-Crafts catalyst and preferably has a softening point greater than or equal to 80 degrees Celsius. The tackifying resins made according to various embodiments of the present invention also exhibit low color and good compatibility. "Compatibility" as used herein means that when the tackifying resin is present in the adhesive, the tangent delta peak as measured by dynamic mechanical analysis such as a torsional melt rheometer is monomodal.

It is believed that maximizing the cyclization of the resin molecule is advantageous to the ability to provide a tackifying resin with a high softening point that is ideal for hot melt and pressure sensitive adhesive compositions. Farnesene is particularly useful in that the monomer forms cyclic structures via a "back biting" mechanism where the growing end of the resin molecule attacks a double bond in the same molecule. This mechanism occurs in the presence of strong Lewis acids. The resulting aliphatic resins have high softening points yet remain compatible with common adhesive formulations. In addition, other monomers may be combined with the farnesene, such as dienes, branched mono-olefins, and vinyl aromatics to provide a monomer feed that may be polymerized to form copolymers with modified properties and compatibility.

The low molecular weight farnesene-based homopolymers or copolymer resins prepared by a Friedel-Crafts catalyst can be homopolymers of farnesene and copolymers of farnesene and at least one diene, branched mono-olefin, vinyl aromatic monomer, and combinations thereof. The amount and type of co-monomer selected may impart desired functionality to the resin.

Farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). As used in the specification and in the claims, "farnesene" means (E)-β-farnesene having the following structure:

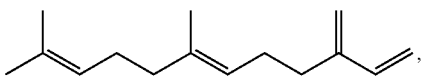

as well (E)-β-farnesene in which one or more hydrogen atoms have been replaced by another atom or group of atoms (i.e. substituted).

The farnesene monomer used to produce various embodiments of the resin according to the present invention may be prepared by chemical synthesis from petroleum resources, extracted from insects, such as Aphldidae, or plants. Therefore, an advantage of the present invention is that the resin may be derived from a monomer obtained via a renewable resource. It is preferably prepared by culturing a microorganism using a carbon source derived from a saccharide. The farnesene resin according to the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and it is preferably a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

As previously noted, tackifying resins according to the present invention may be low molecular weight copolymers that include one or more comonomers. Examples of comonomers include, but are not limited to, styrene, alpha-methyl styrene, 2-methyl styrene, 3-methyl styrene, 4-methyl styrene, 4-t-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl)styrene, 1-vinyl naphthalene, 2-vinyl naphthalene, vinyl anthracene, 4-methoxy styrene, monochlorostyrene, dichlorostyrene, divinyl benzene, indene, methyl indene, butadiene, isoprene, piperylene, myrcene, dipentene, isobutylene, 2-methyl-2-butene, 2-methyl-1-butene, 2-methyl-1-pentene, 2-methyl-2-pentene, 2,3-dimethyl-1-butene, 2,3-dimethyl-2-butene, 2,3-dimethyl-1-pentene, 3,3-dimethyl-1-butene, and 3-methyl-2-pentene, and isomers thereof. Piperylene, styrene, alpha-methyl styrene, 4-methyl styrene, indene, and isomers thereof are preferred.

In various embodiments of the present invention, at least one of $AlCl_3$ and $BF_3$ may be used to polymerize a monomer feed comprising farnesene monomer and a comonomer in which the comonomer content of the monomer feed is ≤90 mol. %, ≤40 mol. %, ≤25 mol. %, or ≤15 mol. %, based on the total moles of the monomer in the monomer feed. Preferably, the polymerization initiator is $AlCl_3$.

According to other embodiments of the present invention, mono-olefin-chain transfer agents may also be polymerized with the farnesene monomers used to produce the tackifying resins. The mono-olefins include, but are not limited to, isobutylene, 2-methyl-2-butene, 2-methyl-1-butene, 2-methyl-1-pentene, 2-methyl-2-pentene, 2,3-dimethyl-1-butene, 2,3-dimethyl-2-butene, 3,3-dimethyl-1-butene, 3-methyl-2-pentene, mixtures thereof, dimers thereof, and oligomers thereof. Isobutylene and 2-methyl-2-butene are preferred.

Friedel-Crafts catalysts are strong Lewis acid catalysts, as explained above, which polymerize monomers via a cationic reaction mechanism. According to various embodiments of the present invention, examples of Friedel-Crafts catalysts that may be used to polymerize a monomer feed comprising farnesene to produce a tackifying resin having a softening point greater than or equal to 80 degrees Celsius include, but are not limited to, boron trifluoride, aluminum trichloride, tin tetrachloride, titanium trichloride, titanium tetrachloride, iron chloride (III), aluminum tri-bromide, dichloromonoethyl aluminum, and complexes thereof, such as boron trifluoride-phenol complex, boron trifluoride-ethanol complex, boron trifluoride-ether complex and the like, especially, boron trifluoride-phenol complex and boron trifluoride-ethanol complex. The Friedel-Craft catalyst may also include a liquid aluminum chloride/hydrochloric acid/substituted aromatics complex, the aromatic being for example o-xylene, mesitylene, ethyl benzene, isopropyl benzene, and the like, such as short or long chain alkylbenzenes. The alkyl chain may be linear or branched and may vary from 2 to 30 carbon atoms. Acidic liquid $AlCl_3$ obtained as by-products during the alkylation of benzene or any other substituted aromatics (toluene, xylenes) with branched chain olefins may also be used. The branched chain olefins may be produced via the boron trifluoride oligomerization of propylene and fractionation (e.g. $C_{12}$ olefins or $C_{24}$ olefins may be alkylated with aromatics).

The Friedel-Crafts catalysts most preferred are $AlCl_3$ and $BF_3$. The resins described herein may be prepared by a continuous solution polymerization process wherein the Friedel-Craft catalyst, co-monomers, and a suitable aromatic or aliphatic hydrocarbon solvent, such as, for example, toluene, xylene, or heptane, are continuously added to a reactor vessel to form the desired homopolymer or copolymer. Alternatively, the farnesene-based polymers may be prepared by a batch process in which all of the initiator, monomers, and solvent are combined in the reactor together substantially simultaneously.

Preferably, during a continuous polymerization reaction, the flow rate of monomer feed and Friedel-Crafts catalyst is controlled, such that the catalyst feed is about 0.01 to 20 wt.

% based on the combined mass flow rate of the monomer, more preferably 0.1 to 5 wt. %, and most preferably 0.1 to 3 wt. %. The reaction temperature of the mixture in the reactor vessel is also preferably maintained at a temperature of about −10 to 50° C., more preferably 0 to 10° C., when using $BF_3$ as the Friedel-Crafts catalyst and about 10 to 60° C., more preferably 20 to 40° C., when using $AlCl_3$.

The low molecular weight farnesene-based homopolymers or copolymers of the resins according to embodiments of the present invention may have a number average molecular weight between 400 and 10,000 g/mol, preferably 400 to 4000, as measured through a gel permeation chromatograph and converted using polystyrene calibration.

It is another aspect of the present invention to provide an adhesive composition comprising at least one elastomer and at least one tackifying resin. The at least one tackifying resin may comprise a low molecular weight resin containing a farnesene derived (co)polymer having a softening point greater than or equal to 80 degrees Celsius, as described above. Some embodiments may also comprise a blend of tackifying resins comprising a combination of a farnesene derived (co)polymer and a second tackifying resin. The second tackifying resin may include, but are not limited to, C5, C5/C9, C9, pure monomer, rosin esters, and the hydrogenated versions thereof.

According to various embodiments of the adhesive composition of the present invention, the adhesive resin may be selected from the group consisting of styrene-isoprene block copolymers, polyacrylate resins, poly ethylene vinyl acetate (EVA) resins, polystyrene butadiene resins, random styrenebutadiene (SBR) copolymers, styrene-butadiene block copolymers, styrene-isoprene-butadiene-styrene (SIBS), styrene-ethylene-propylene-styrene (SEPS), styrene-ethylene-butylene-styrene (SEBS) block copolymers, amorphous polyolefin (APO) resins, and mixtures thereof.

The adhesive compositions according to various embodiments of the present invention may also include a processing oil. Examples of processing oils include, but are not limited to, paraffinic, aliphatic-naphthenic aromatic resins, polyethylene glycol, petroleum oils, ester plasticizers, vulcanized vegetable oils, pine tar, phenolic resins, petroleum resins, polymeric esters and rosins. A processing oil may be used in an amount ranging from about 0 to about 50 wt. % based on the total weight of adhesive resin in the adhesive composition with a range of from about 5 to 35 wt. % being preferred.

The tackifying resins according to the present invention may be incorporated into an adhesive composition by any method known to those having skill in the art. For example, one or more tackifying resins may be added during the compounding of the adhesive composition.

An exemplary conventional hot melt adhesive includes a styrene-isoprene-styrene (SIS) block copolymer, a hydrocarbon (C5 or C5/C9) tackifying resin, a rosin ester tackifier, and/or a process oil. A tackifying resin derived from farnesene may be used to replace all or part of the C5 or C5/C9 tackifying resin or rosin ester tackifier of this exemplary formulation. A SIS block copolymer may be employed in the hot melt adhesive, such as that which is sold by Kraton Performance Polymers Inc. of Houston, Tex. under the trade name Kraton. A C5 hydrocarbon tackifying resin may be utilized, such as that which is sold by Total Petrochemicals and Refining, Inc. of Houston, Tex. under the trade name Wingtack. A naphthenic process oil may be used in the hot melt adhesive as well, such as the one sold under the trade name Nyflex by Nynas AB of Stockholm, Sweden.

As is known to one skilled in the art, conventional hot melt adhesives may include a variety of other components including, but not limited to, starches, waxes, plasticizers, anti-oxidants, stabilizers, pigments, dyes, biocides, flame retardants, antistatic agents, or fillers. For example, the hot melt adhesive may include Ethanox 310, an antioxidant sold by Albemarle Corporation of Baton Rouge, La.

The components of an adhesive composition according to the present invention may be combined by any process known to one skilled in the art. For example, they may be introduced separately from each other and separate from, or in combination with, any of the individual components of the conventional adhesive composition. As a further example, the tackifying resin derived from farnesene may be introduced to a composition comprising a styrene-isoprene-styrene (SIS) block copolymer and optionally, a hydrocarbon (C5-C9) tackifying resin. A process oil, such as mineral oil, may be added last. The adhesive composition may be mixed with a sigma blade mixer, for example, until it is homogeneous. Other methods of mixing include, but are not limited to, single or twin screw, and conventional tanks equipped with mixers like an anchor or turbine.

EXAMPLES

The advantageous properties of this invention can be observed by reference to the following examples, which illustrate but do not limit the invention.

Polymerization of β-farnesene alone or with one or more comonomers was conducted in round bottom flasks equipped with mechanical stirrers and a means of temperature control via a semi-batch method. ß-Farnesene, alone or with one or more comonomers, was added to the reaction flask as a 50-60% solution (total monomer) in a solvent, such as toluene, hexane, heptane, or a mixed paraffin/olefin (MPO) stream containing cyclopentene and cylcopentane, along with minor amounts of 2-methyl-2-butene and cis- and trans-1,3-pentadiene (piperylenes).

Moisture content in the feed blends was adjusted to 400 to 600 ppm for optimal catalyst activation.

Example 1 Copolymerization of Farnesene and 2-Methyl-2-Butene

Sample 1 was prepared in a round bottom flask (reactor) equipped with a stirrer that was purged with nitrogen for 30 minutes. 20 g of toluene were added to the reactor and the contents warmed to 25° C. 93 g of β-farnesene were blended with 100 g of toluene solvent to prepare the monomer feed. 2.25 g of $AlCl_3$ was divided into three aliquots of approximately 0.75 g. A 0.75 g aliquot of $AlCl_3$ was added to the toluene charge followed by a continuous addition of the monomer feed to the stirred reactor at a rate of 4.5 ml per minute. When half of the feed had been added, an additional aliquot of 0.75 g of $AlCl_3$ was added. After the last of the monomer feed had been added, a third aliquot of 0.75 g of $AlCl_3$ was added and the mixture stirred at temperature for an 40 minutes. The reaction was then quenched by the addition of 100 g aqueous 2-propanol (25%). After agitating the mixture, the layers are allowed to separate. The organic phase was isolated and washed once more with same amount of 25% 2-propanol followed by one wash with distilled water. 0.2 g of tetrakis [methylene-3 (3',5'-di-tert-butyl-4-hydroxyphenyl)propionate]methane was added to the washed organic phase in a 3-neck round bottom flask equipped for distillation. The mixture was purged with nitrogen while being heated to 230° C. during which time volatile organics were collected. Once the temperature had reached 230° C., the nitrogen was replaced by steam. Oligomeric product and steam condensate were collected until approximately one gram of steam distillate per gram resin product was obtained. The characteristics of Sample 4 are provided in Table 1.

Example 2 Copolymerization of Farnesene, Piperylene, Alpha-Methylstyrene, and 2-Methyl-2-Butene Sample 2 was prepared in a round bottom flask (reactor) equipped with a stirrer that was purged with nitrogen for 30 minutes. 20 g of toluene were added to the reactor and the contents warmed to 30° C. 43.6 g of β-farnesene, 6.0 g of 2-methyl-2-butene, 2.8 g α-methylstyrene, and 2.0 g of piperylene concentrate were blended with 48.1 g of MPO to prepare the monomer feed. 1.0 g of AlCl₃ was divided into two 0.5 g aliquots. A 0.5 g aliquot of AlCl₃ was added to the toluene charge followed by a continuous addition of the monomer feed to the stirred reactor at a fixed rate of 2.5 ml per minute. After the addition of 50 mL of feed, a second aliquot of 0.5 g of AlCl₃ was added. After adding the last of the monomer feed to the reaction mixture, the mixture was stirred at temperature for an additional 45 minutes. The reaction was then quenched by the addition of 50 g aqueous 2-propanol (25%). After agitating the mixture, the layers were allowed to separate. The organic phase was isolated and washed once more with same amount of 25% 2-propanol followed by one wash with distilled water. 0.1 g of tetrakis [methylene-3 (3',5'-di-tert-butyl-4-hydroxyphenyl) propionate]methane was added to the washed organic phase in a 3-neck round bottom flask equipped for distillation. The mixture was purged with nitrogen while being heated to 230° C. during which time volatile organics were collected. Once the temperature had reached 230° C., the nitrogen was replaced by steam. Oligomeric product and steam condensate were collected until approximately one gram of steam distillate per gram resin product was obtained. The characteristics of Sample 2 are provided in Table 1.

Example 3 Copolymerization of Farnesene, Piperylene, Alpha-Methylstyrene, and 2-Methyl-2-Butene Sample 3 was prepared in a round bottom flask (reactor) equipped with a stirrer that was purged with nitrogen for 30 minutes. 20 g of toluene were added to the reactor and the contents warmed to 30° C. 42.1 g of β-farnesene, 2.5 g of 2-methyl-2-butene, 5.5 g α-methylstyrene, and 2.0 g of piperylene concentrate were blended with 48.1 g of MPO to prepare the monomer feed. 1.0 g of AlCl₃ was divided into two 0.5 g aliquots. A 0.5 g aliquot of AlCl₃ was added to the toluene charge followed by a continuous addition of the monomer feed to the stirred reactor at a fixed rate of 2.5 ml per minute. After the addition of 50 mL of feed, a second aliquot of 0.5 g of AlCl₃ was added. After the last of the monomer feed the reaction mixture had been added, the mixture was stirred at temperature for an additional 45 minutes. The reaction was then quenched by the addition of 50 g aqueous 2-propanol (25%). After agitating the mixture, the layers are allowed to separate. The organic phase was isolated and washed once more with same amount of 25% 2-propanol followed by one wash with distilled water. 0.1 g of tetrakis [methylene-3 (3',5'-dl-tert-butyl-4-hydroxyphenyl)propionate]methane was added to the washed organic phase in a 3-neck round bottom flask equipped for distillation. The mixture was purged with nitrogen while being heated to 230° C. during which time volatile organics were collected. Once the temperature had reached 230° C., the nitrogen was replaced by steam. Oligomeric product and steam condensate were collected until approximately one gram of steam distillate per gram resin product was obtained. The characteristics of Sample 3 are provided in Table 1.

Example 4 Copolymerization of Farnesene, Piperylene, Alpha-Methylstyrene, and 2-Methyl-2-Butene Sample 4 was prepared in a round bottom flask (reactor) equipped with a stirrer that was purged with nitrogen for 30 minutes. 30 g of toluene were added to the reactor and the contents warmed to 30° C. 28.9 g of farnesene, 13.2 g of 2-methyl-2-butene, 7.7 g α-methylstyrene, and 40.4 g of piperylene concentrate were blended with 111 g of MPO to prepare the monomer feed. 2.5 g of AlCl₃ was divided into four aliquots of approximately 0.6 g. A 0.6 g aliquot of AlCl₃ was added to the toluene charge followed by a continuous addition of the monomer feed to the stirred reactor at a fixed rate of 2.5 ml per minute. After the addition of 70 mL of feed, an additional aliquot of 0.6 g of AlCl₃ was added. This sequence was continued until all the initiator and feed had been added. After the last of the monomer feed had been added, the mixture was stirred at temperature for an additional 45 minutes. The reaction was then quenched by the addition of 100 g aqueous 2-propanol (25%). After agitating the mixture, the layers are allowed to separate. The organic phase was isolated and washed once more with same amount of 25% 2-propanol followed by one wash with distilled water. 0.3 g of tetrakis [methylene-3 (3',5'-di-tert-butyl-4-hydroxy-phenyl)propionate]methane was added to the washed organic phase in a 3-neck round bottom flask equipped for distillation. The mixture was purged with nitrogen while being heated to 230° C. during which time volatile organics were collected. Once the temperature had reached 230° C., the nitrogen was replaced by steam. Oligomeric product and steam condensate were collected until approximately one gram of steam distillate per gram resin product was obtained. The characteristics of Sample 4 are provided in Table 1.

TABLE 1

Resin physical properties

| Table 1 | Sample 1 | Sample 2 | Sample 3 | Sample 4 |
|---|---|---|---|---|
| AlCl3, wt. % (on total feed) | 1.2 | 1.1 | 1.5 | 1.2 |
| Farnesene (mol %) | 83 | 67 | 63 | 14 |
| 1,3-Pentadiene (mol %) | | 7 | 8 | 51 |
| AMS (mol %) | | 7 | 14 | 7 |
| 2-Methyl-2-butene (mol %) | 17 | 19 | 15 | 28 |
| Toluene (g) | 100 | | | |
| MPO (g) | | 48 | 48 | 111 |
| Soft. Pt. (° C.) | 101 | 99 | 100 | 99 |
| Tg (° C.) | 46 | 46 | 49 | 50 |
| Mn | 924 | 931 | 975 | 896 |
| Mw | 2030 | 1951 | 2171 | 1475 |
| Mz | 4654 | 4425 | 5024 | 2466 |
| MWD | 2.20 | 2.10 | 2.23 | 1.65 |

Adhesive Applications Testing of Farnesene-Containing Resins

Farnesene-containing analogues of various C5 resins were evaluated in traditional hot melt pressure sensitive adhesive compositions that utilize styrene isoprene linear triblock copolymer as the styrenic block-copolymer (SBC). The C5 resins used as comparative samples were various grades of Wingtack (manufactured by Total Petrochemicals and Refining, Inc. of Houston, Tex.) and derived from a monomer stream composed primarily of piperylene.

The resins were screened in a typical "General Purpose" formulation made up of the following components.

| Ingredient | Percentage by Weight |
| --- | --- |
| SBC-SIS Triblock Copolymer (Kraton D1163) | 40 |
| Tackifying Resin | 50 |
| Naphthenic Oil | 9 |
| Antioxidant | 1 |

The tackifying resins incorporated into the various samples of the adhesive formulations included the following:

| Adhesive Sample Name | Type of Resin Used |
| --- | --- |
| WT95 | C5 (Wingtack 95) |
| WT Plus | C5 (5% aromatic) (Wingtack Plus) |
| WT Extra | C5 (10% aromatic) (Wingtack Extra) |
| FT95 | Sample 1 |
| FT-5% | Sample 2 |
| FT-10% | Sample 3 |

Adhesive compositions were compounded in an open-top sigma blade mixer at 350° F. (177° C.) under a nitrogen blanket. All mixing times were kept to less than 60 minutes to minimize degradation of the SBC. First, SBC and enough Irganox 1010 antioxidant (AO) were combined to yield approximately 1% by weight of the Irganox in the final adhesive formulation and masticated at 100 rpm for approximately 5-10 minutes. Approximately one-third to one-half of the resin was slowly added over a few minutes while mixing. The composition was mixed for another 10-15 minutes. The remainder of the resin was slowly added over a few minutes and then mixed another 10-15 minutes. Finally, the oil was slowly added over several minutes while mixing and then mixed another 10 minutes. The adhesive composition was transferred to a suitable container coated with a release-type coating in order to facilitate easy removal of the adhesive when cool.

Samples of the adhesive compositions were coated onto 2 mil (50 micron) PET at an approximate thickness of 0.9 mils (22 microns) dry. The adhesive coated PET was laminated to release paper and allowed to condition at 50% relative humidity and 73° F. a minimum of 24 hours before testing. One inch wide strips were cut and tested according to methods detailed by the Pressure Sensitive Tape Council (PSTC).

180° Peel Adhesion testing was conducted using 1 inch wide test specimen and Stainless Steel (SS), Corrugated Cardboard (CC) and High Density Polyethylene (HDPE) test substrates. All adhesion test results were reported in Pounds per Inch Width. Loop Tack testing was conducted using the same three test substrates and reported in the same Pounds per Inch Width. Room Temperature Shear testing was conducted using test specimens that were 0.5" wide with an overlap of 0.5" (total ¼ in² contact area) and were tested using 500 g weights and SS panels as well as un-bleached kraft paper held to the test panels with double-faced tape. Heat Resistance was determined by measuring the Shear Adhesion Failure Temperature (SAFT) and reported in ° C. Test specimens for the SAFT determination were 1 inch wide and had a contact area of 1 in² with a weight of 1000 grams. All testing was conducted in triplicate and the average results were reported.

Figure 2:
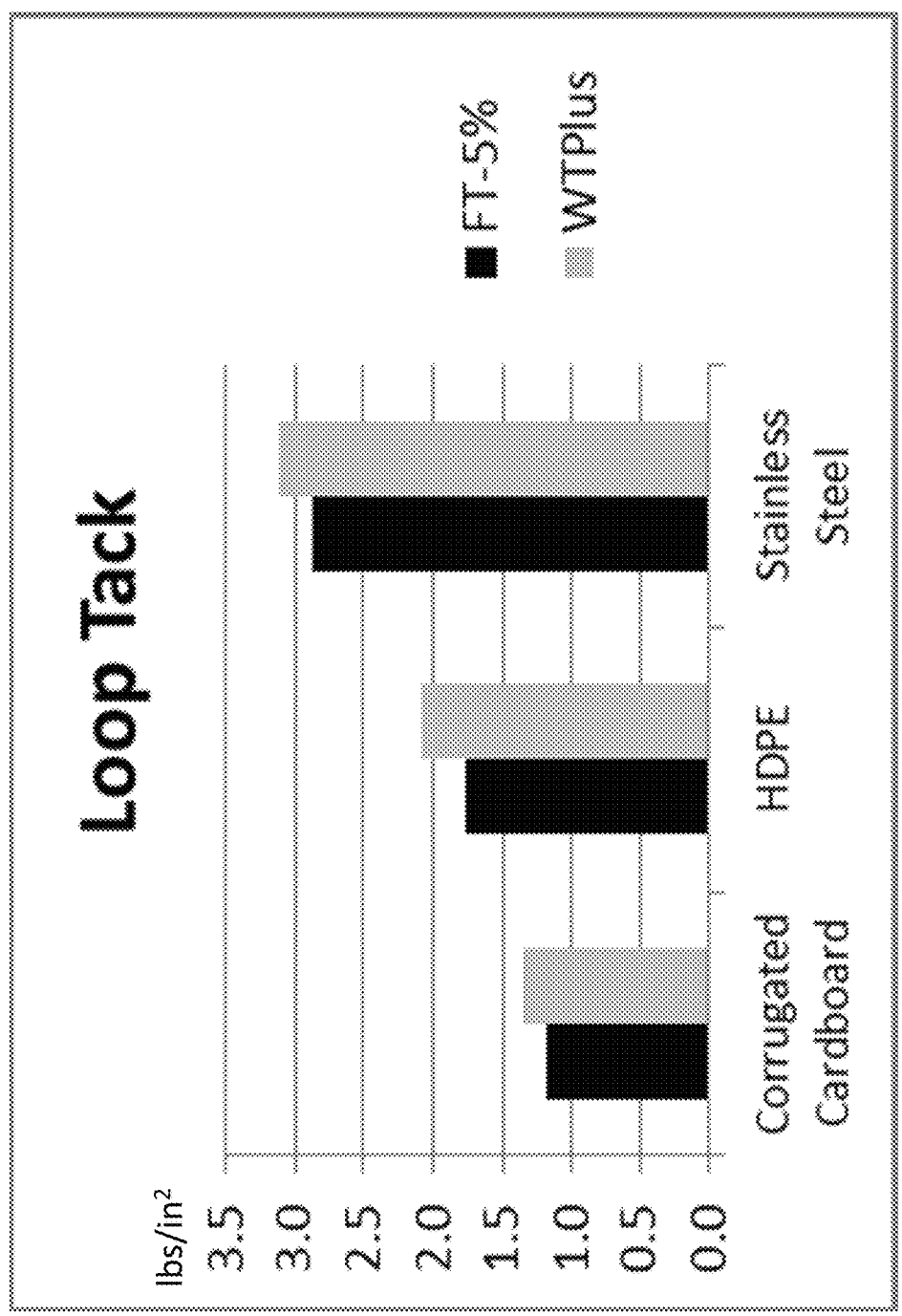
FIG. 2 is a Loop Tack graph comparing an adhesive composition according to a second embodiment of the present invention and a comparative adhesive composition containing a similar C5 tackifying resin.
Figure 3:
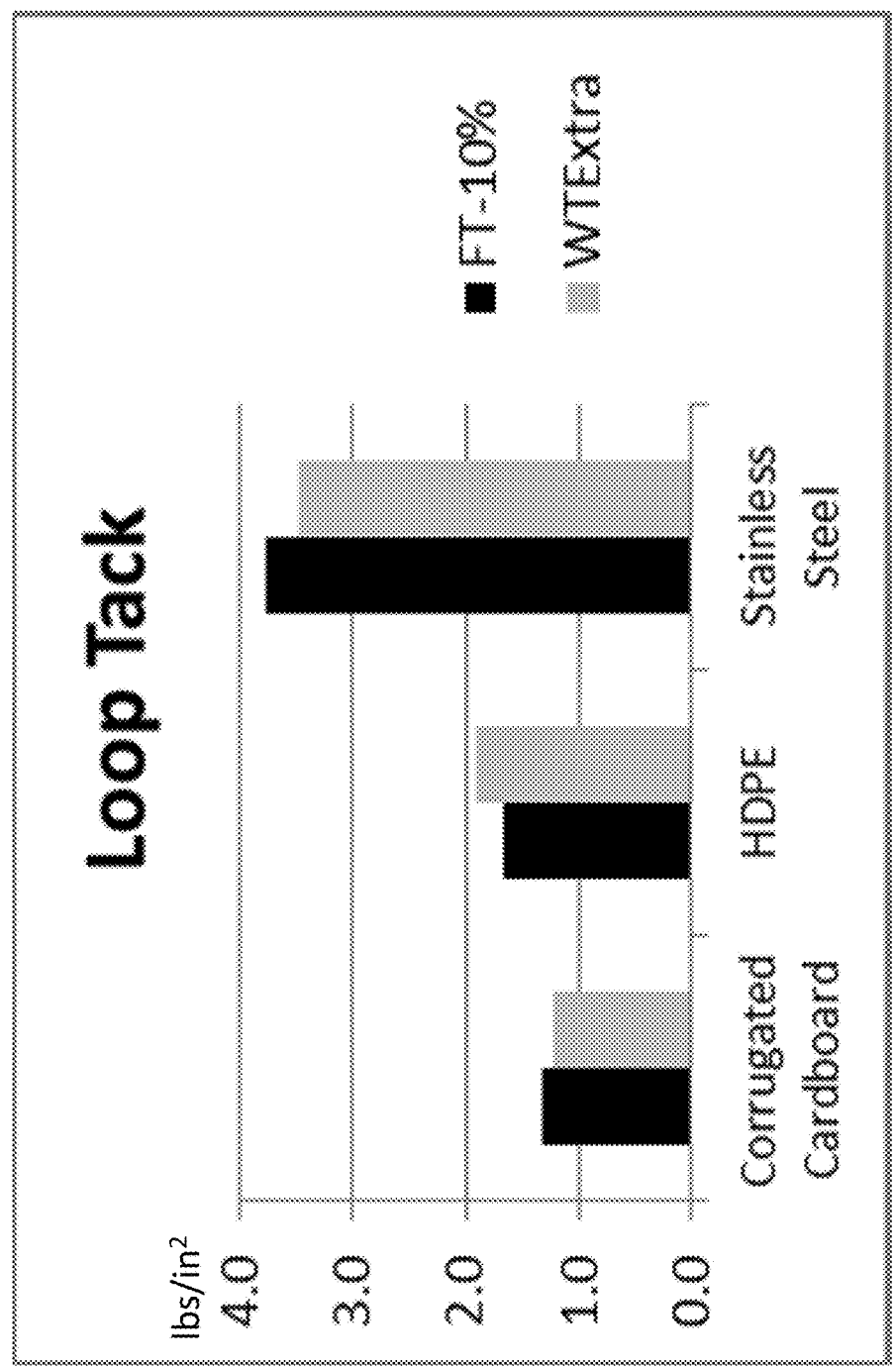
FIG. 3 is a Loop Tack graph comparing an adhesive composition according to a third embodiment of the present invention and a comparative adhesive composition containing a similar C5 tackifying resin.

As seen in FIGS. 1 to 3, the three Loop Tack graphs comparing the farnesene-based product with its Wingtack counterpart exhibit similar performance. The mode of failure for the Corrugated Cardboard samples was a 100% delamination of the cardboard which is most desirable.

Figure 4:
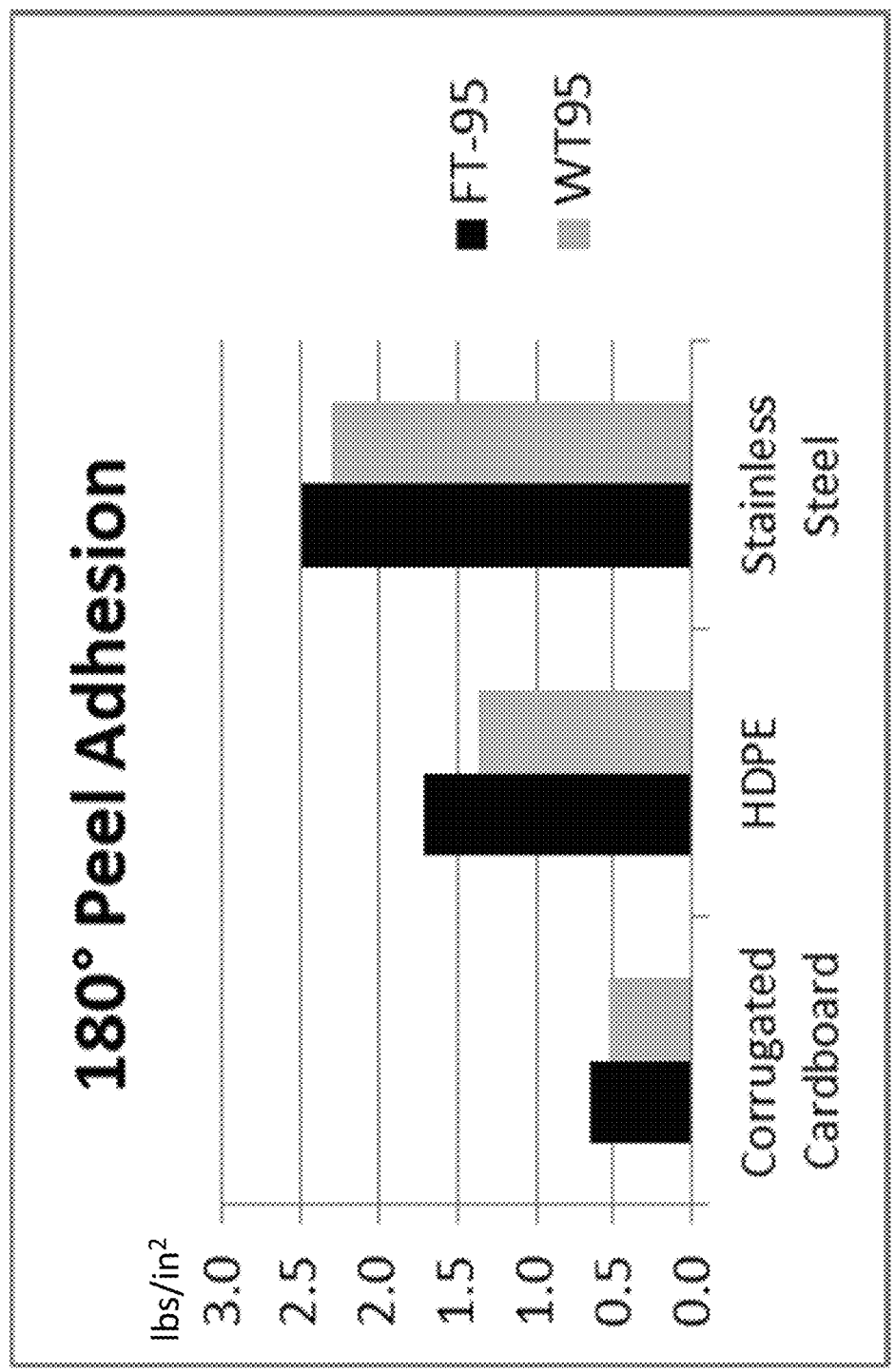
FIG. 4 is a graph of an 180° Peel Adhesion test comparing the adhesive composition according to the first embodiment of the present invention and the comparative adhesive composition containing the similar C5 tackifying resin.
Figure 5:
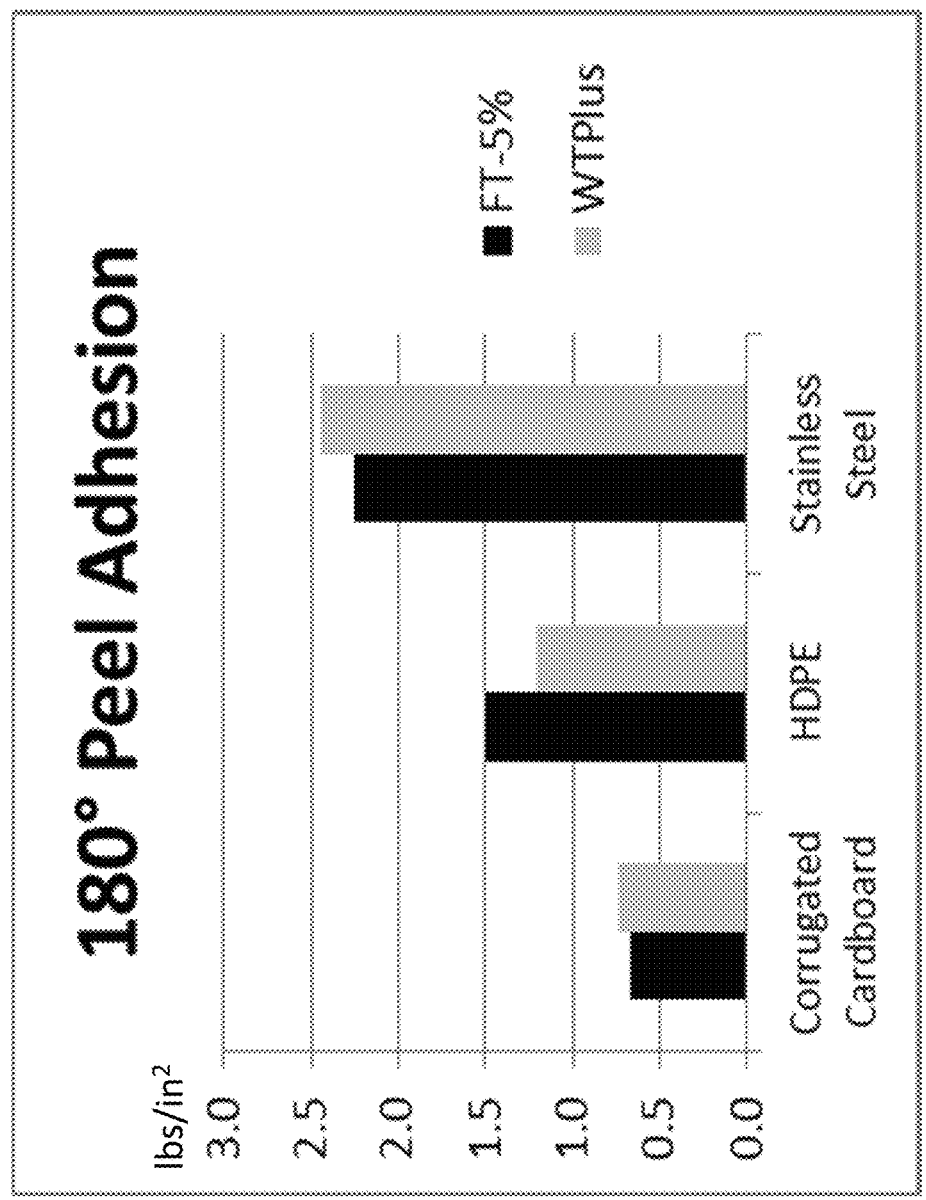
FIG. 5 is a graph of an 180° Peel Adhesion test comparing the adhesive composition according to the second embodiment of the present invention and the comparative adhesive composition containing the similar C5 tackifying resin.
Figure 6:
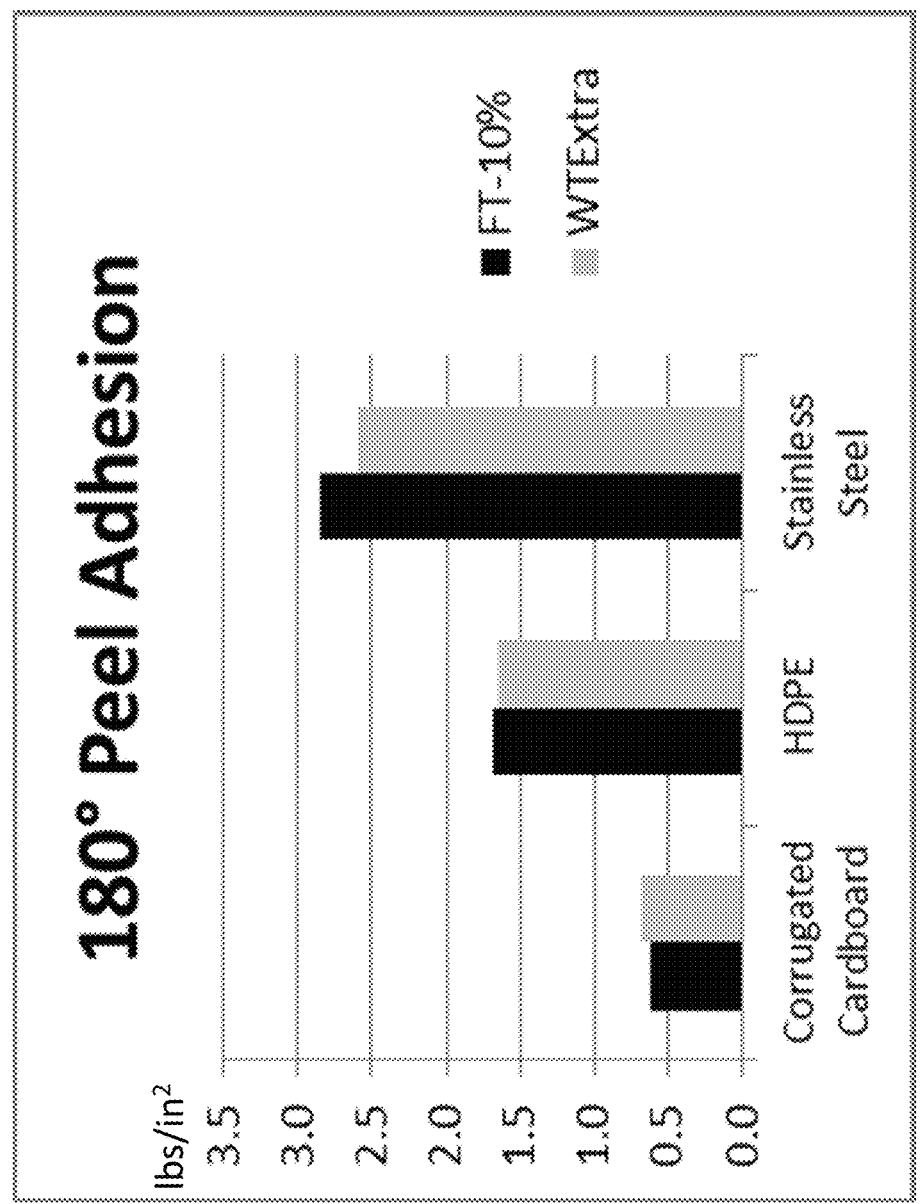
FIG. 6 is a graph of an 180° Peel Adhesion test comparing the adhesive composition according to the third embodiment of the present invention and the comparative adhesive composition containing the similar C5 tackifying resin.

Referring to FIGS. 4-6, the three charts display the results of 180° Peel Adhesion testing. There is some slight variation between the results of the farnesene based adhesives containing varying levels of aromatic content, but in general the values are essentially within the experimental error involved in the testing. Again, all testing against Corrugated Cardboard resulted in the delamination of the cardboard.

The results of Room Temperature Shear testing using stainless steel is listed in Table 2 below.

TABLE 2

| | Initial Shear on SS Shear, ½" × ½" × 0.5 kg, SS, Minutes | | | | |
| --- | --- | --- | --- | --- | --- |
| | 1 | 2 | 3 | Avg. | StdDev |
| FT-95 | 24300 | 24300 | 24300 | 24300 | 0 |
| WT95 | 24300 | 24300 | 24300 | 24300 | 0 |
| FT-5% | 24300 | 24300 | 24300 | 24300 | 0 |
| WTPlus | 24300 | 24300 | 24300 | 24300 | 0 |
| FT-10% | 24300 | 24300 | 24300 | 24300 | 0 |
| WTExtra | 24300 | 24300 | 24300 | 24300 | 0 |

All samples were still hanging after 24,300 minutes (405 hours) when they had to be removed from the test equipment to make room for the next group of samples. Therefore, no performance difference was observed between the adhesive compositions containing resins made using traditional C5 feeds from resin made with farnesene-based resins.

The Room Temperature Shear results when the test specimens were tested off of kraft paper displayed more variability in the results; however, all values, provided below in Table 3, were high enough that the adhesives would be able to function as general purpose adhesives regardless of the tackifier resin used.

TABLE 3

| | Initial Shear on kraft paper Shear, ½" × ½" × 0.5 kg, Minutes, kraft paper | | | | |
| --- | --- | --- | --- | --- | --- |
| | 1 | 2 | 3 | Avg | StdDev |
| FT-95 | 3493.8 | 5586.7 | 2254.3 | 3778 | 1684 |
| WT95 | 4993.2 | 9897.1 | 9816.0 | 8235 | 2808 |
| FT-5% | 3638.7 | 3810.9 | 3284.8 | 3578 | 268 |
| WTPlus | 614.2 | 1351.1 | 1242.2 | 1069 | 398 |
| FT-10% | 1238.2 | 1766.2 | 1600.9 | 1535 | 270 |
| WTExtra | 3378.3 | 4838.1 | 1889.7 | 3369 | 1474 |

In general the performance of the farnesene-based analogues of the C5 resins was essentially the same as the commercial C5 resin.

Figure 7:
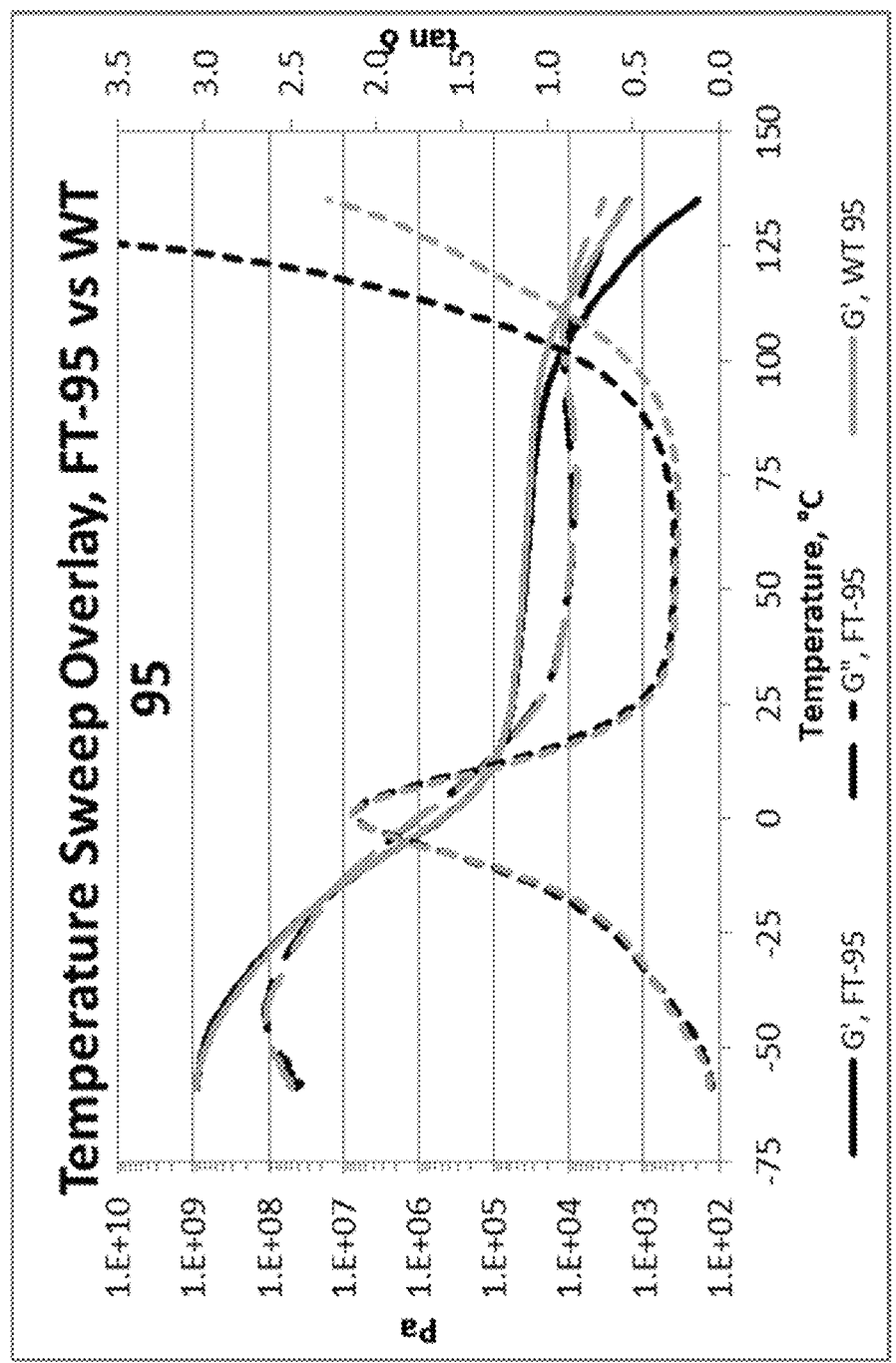
FIG. 7 is a graph of a rheological evaluation comparing the adhesive composition according to the first embodiment of the present invention and the comparative adhesive composition containing the similar C5 tackifying resin.

Referring now to the rheological evaluation (temperature sweep), illustrated in FIG. 7, the adhesives incorporating with farnesene-based resins and C5 resins were substantially identical. The performance, however, begins to differ around 70° C. and higher. According to the rheological curve the farnesene-based resin yielded an adhesive with lower heat resistance, meaning it will become fluid at a lower temperature. Expressed another way, the farnesene-based adhesives will have a lower viscosity and be more readily coatable and sprayable at the same or lower temperature as a comparative adhesive composition containing a traditional C5 resin. This would provide energy savings for a consumer because a lower temperature would be required to apply an adhesive composition using a farnesene-based resin as a hot melt adhesive to a substrate.

Figure 8:
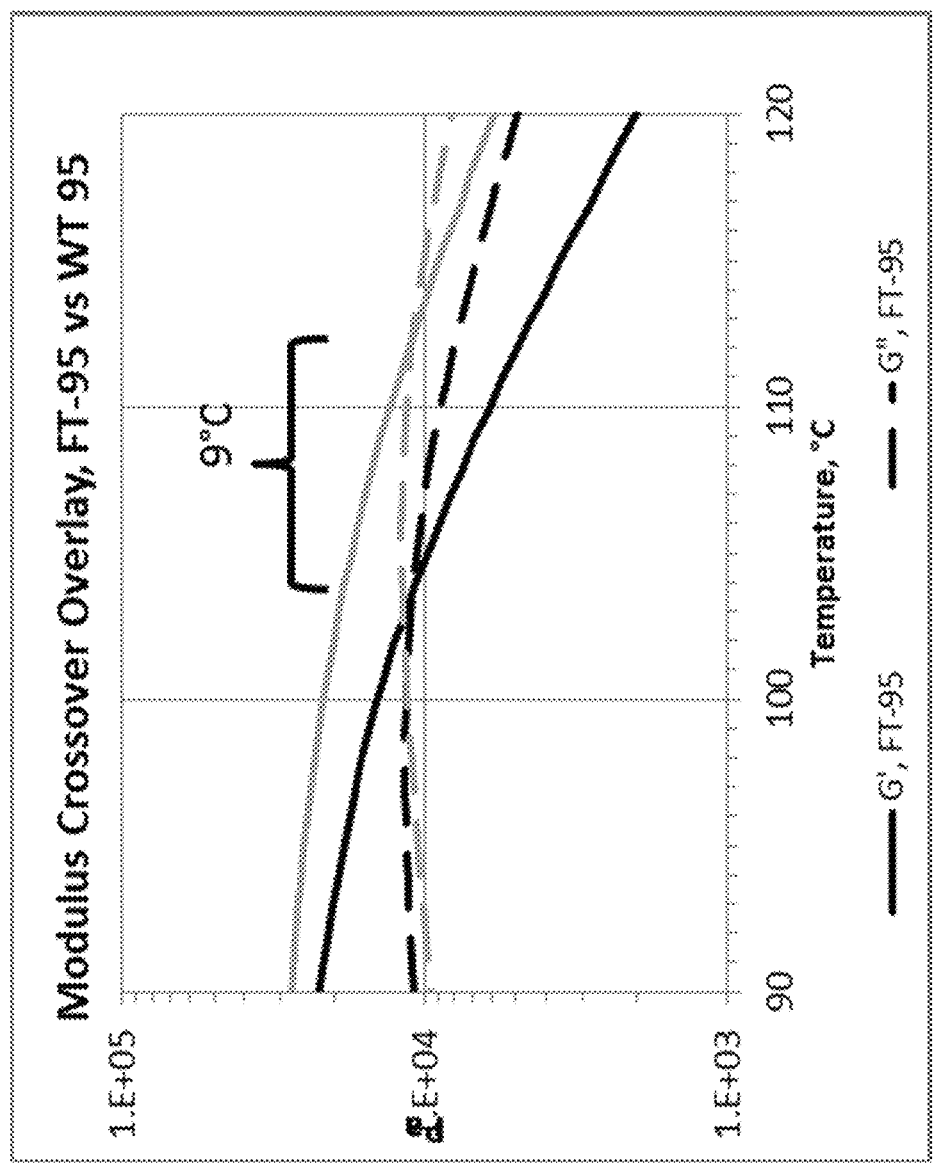
FIG. 8 is a graph of the adhesive moduli using the data from the rheological evaluation of FIG. 7.

Focusing on the adhesive moduli (G' and G") in FIG. 8, it is clear that the crossover for the farnesene-containing adhesive is about 9° C. lower than the C5 resin-containing adhesive (103 vs 112° C.). This is similarly reflected by the lower viscosity and heat resistance (as measured by the Shear Adhesion Failure Temperature) of the adhesive containing the farnesene-based resin relative to the comparative adhesive composition, as provided in FIGS. 9 and 10, respectively.

Figure 9:
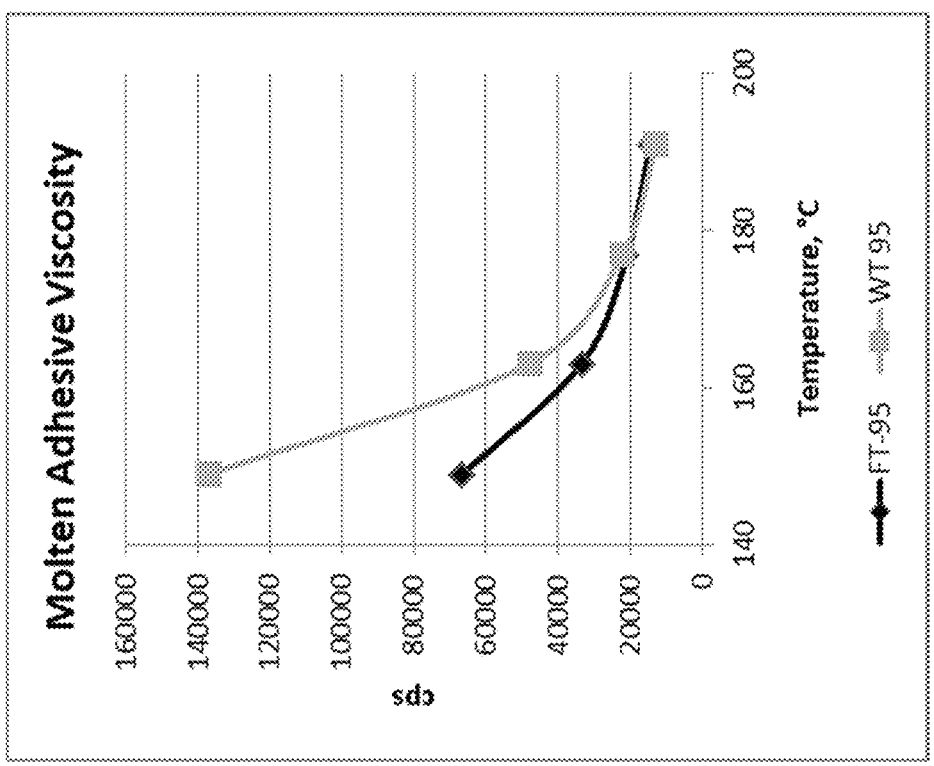
FIG. 9 is a graph comparing the molten adhesive viscosity of the adhesive composition according to the first embodiment of the present invention and the comparative adhesive composition containing the similar C5 tackifying resin.
Figure 10:
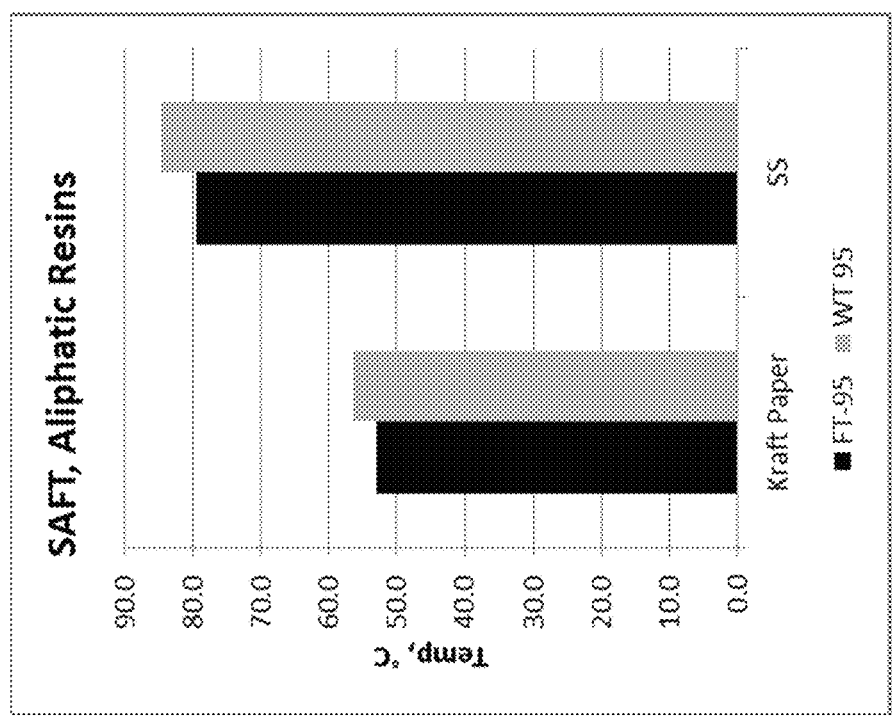
FIG. 10 is a graph comparing the Shear Adhesion Failure Temperature of the adhesive composition according to the first embodiment of the present invention and the comparative adhesive composition containing the similar C5 tackifying resin.

As seen in FIG. 9, there is a 50% decrease in the molten viscosity of the adhesive at 149° C. (137,000 to 66,000 cps) when using the farnesene-based resin. This is a dramatic drop in adhesive viscosity, which may allow the adhesive coater to reduce application temperatures to save energy. The heat resistance of the adhesives as measured by SAFT in FIG. 10 only drops 3° C. on Kraft Paper and 5° C. on Stainless Steel.

In order to determine the effects of a partial substitution, two different adhesive compositions were prepared: a control sample made with Wingtack Extra and a second adhesive composition (Ex-30F) made using Sample 4 as the tackifying resin. The adhesives were made using the same mixture as above, 50% Resin, 40% SIS, 9% Oil and 1% Antioxidant.

The adhesives were coated at 0.9 mils thick onto release liner and laminated to 2 mil PET for testing. All tests were conducted according to PSTC test methodology. The Peel Adhesion and Loop Tack were determined on Stainless Steel (SS), HDPE and Corrugated Cardboard. The Shear Adhesion Failure Temperature (SAFT) was determined off of Stainless Steel and Kraft Paper laminated to a shear panel.

Figure 11:
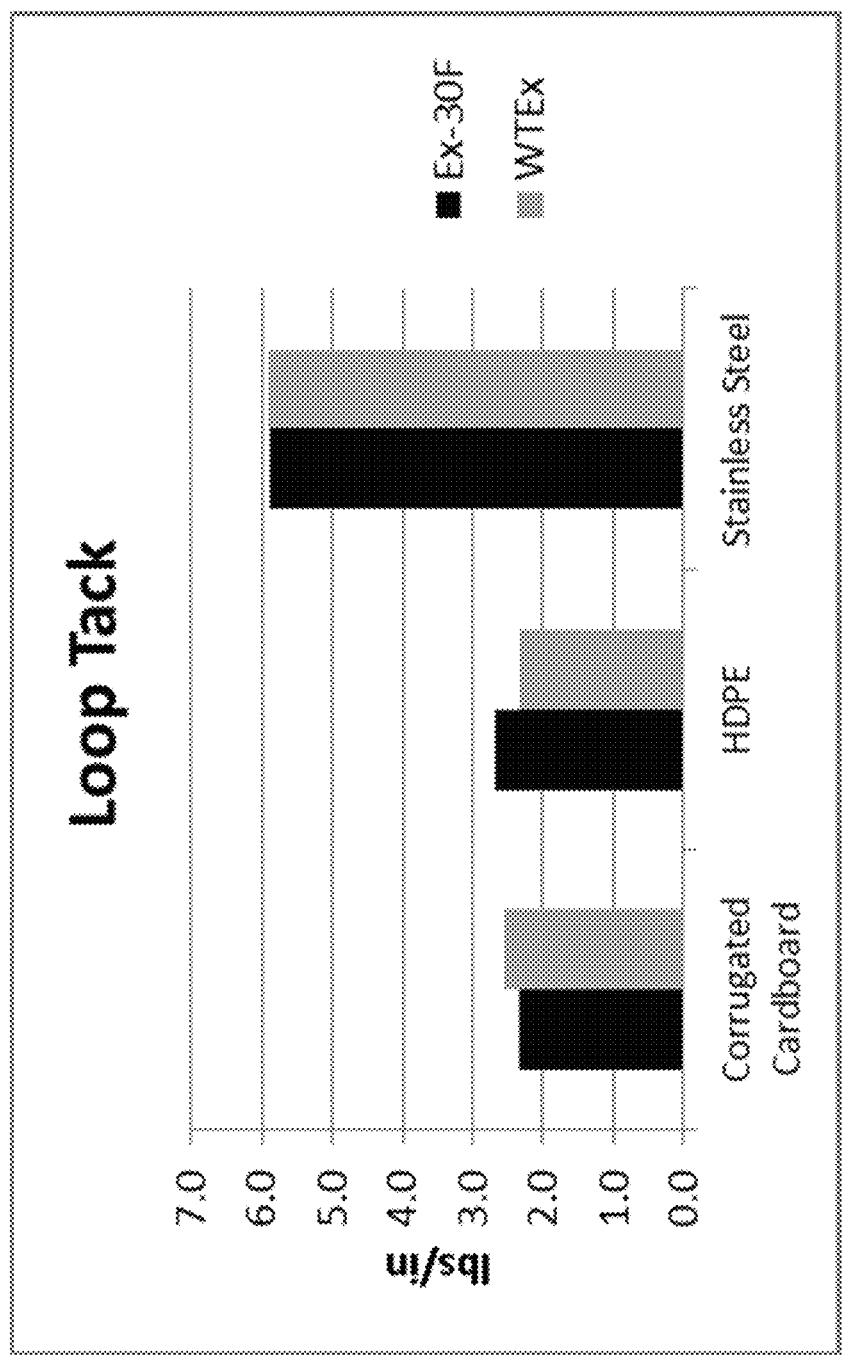
FIG. 11 is a Loop Tack graph comparing two samples of an adhesive composition according to a fourth embodiment of the present invention and a comparative adhesive composition containing a C5 tackifying resin.
Figure 12:
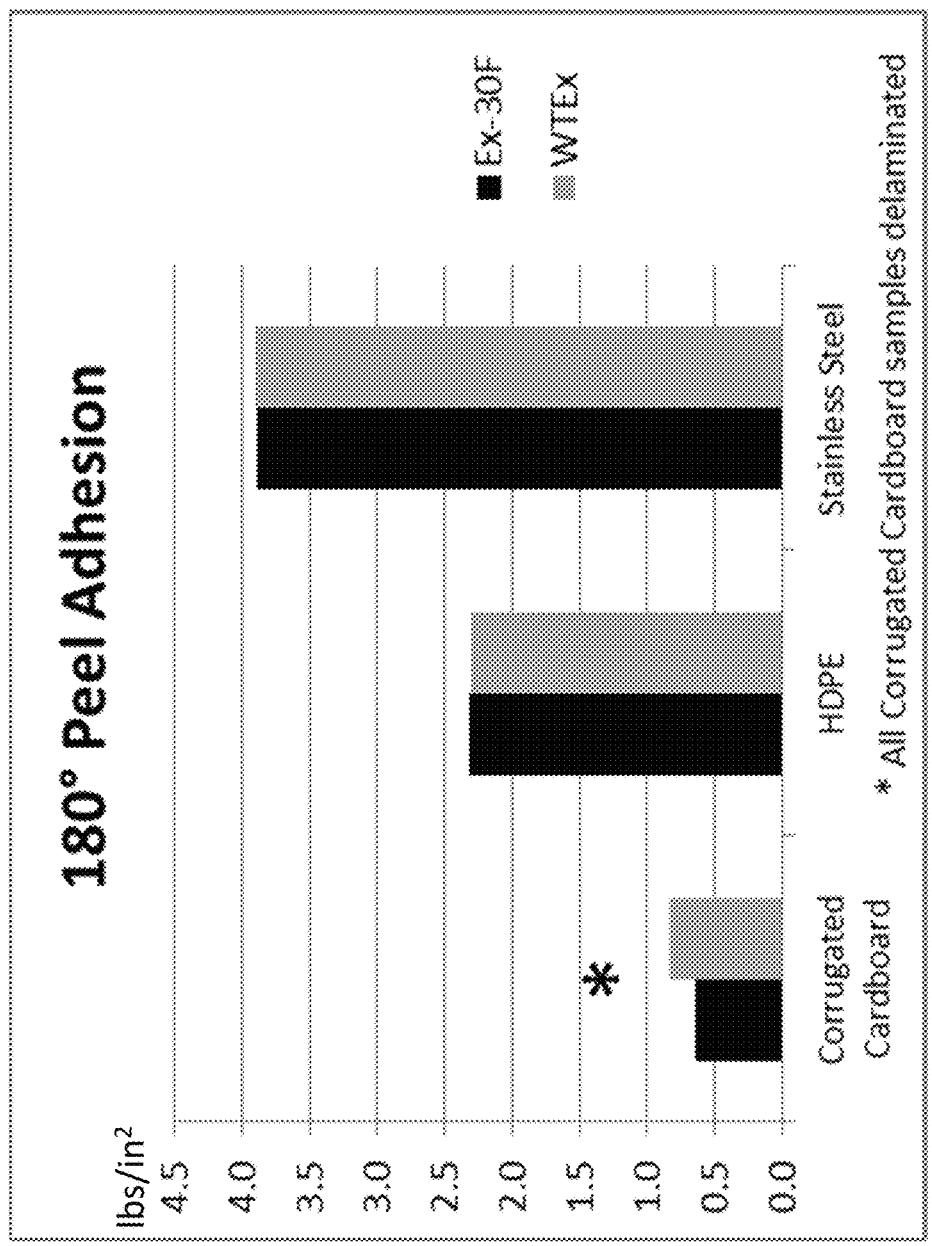
FIG. 12 is a graph of an 180° Peel Adhesion test comparing two samples of the adhesive composition according to the fourth embodiment of the present invention and the comparative adhesive composition containing the C5 tackifying resin.
Figure 13:
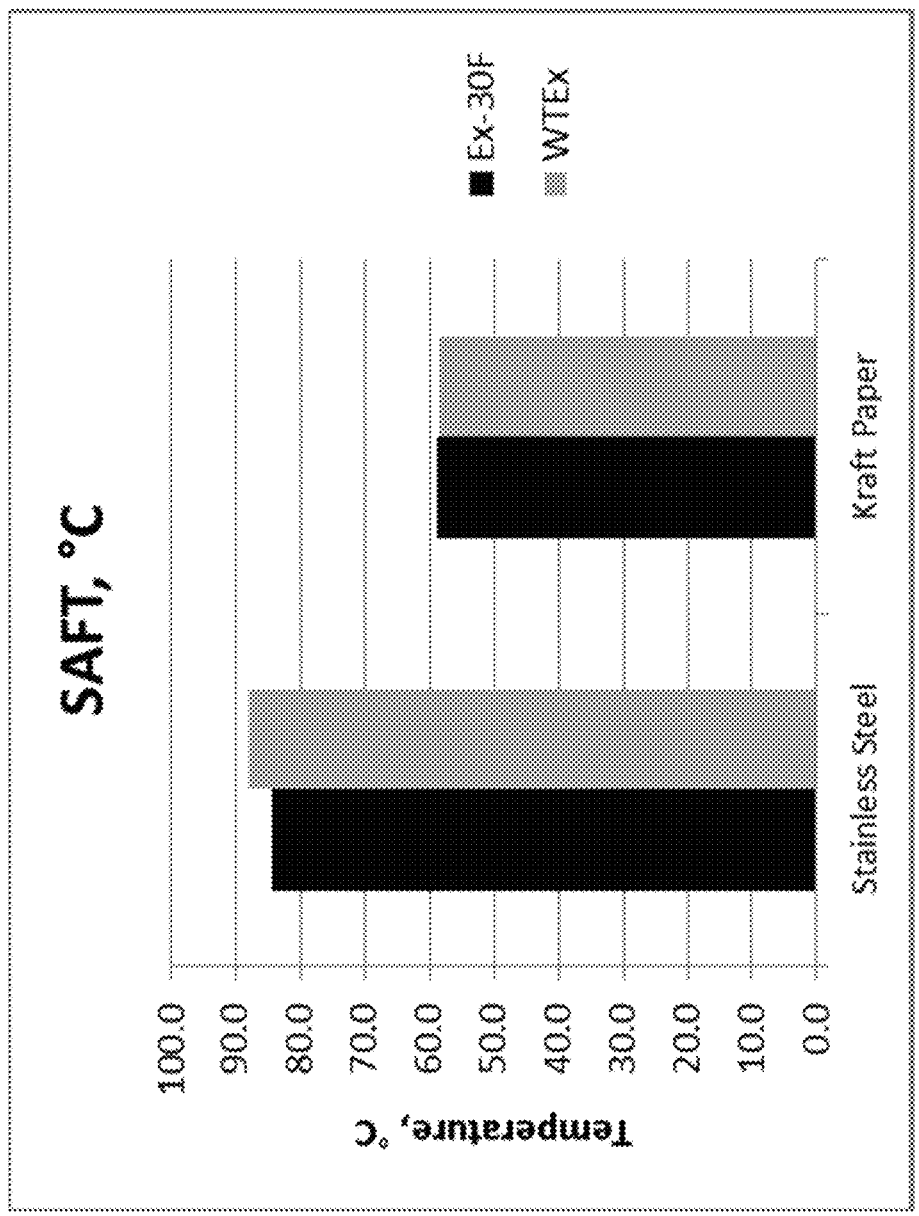
FIG. 13 is a graph comparing the Shear Adhesion Failure Temperature of the two samples of the adhesive composition according to the fourth embodiment of the present invention and the comparative adhesive composition containing the C5 tacklfying resin.

As seen in the FIGS. 11 and 12, the Peel Adhesion and Loop Tack are very similar between the Wingtack Extra sample and the resin made with Sample 4. The SAFT on SS was approximately 3° C. lower with the adhesive comprising the farnesene containing resin, but approximately the same when tested on kraft paper, as provided in FIG. 13.

Figure 15:
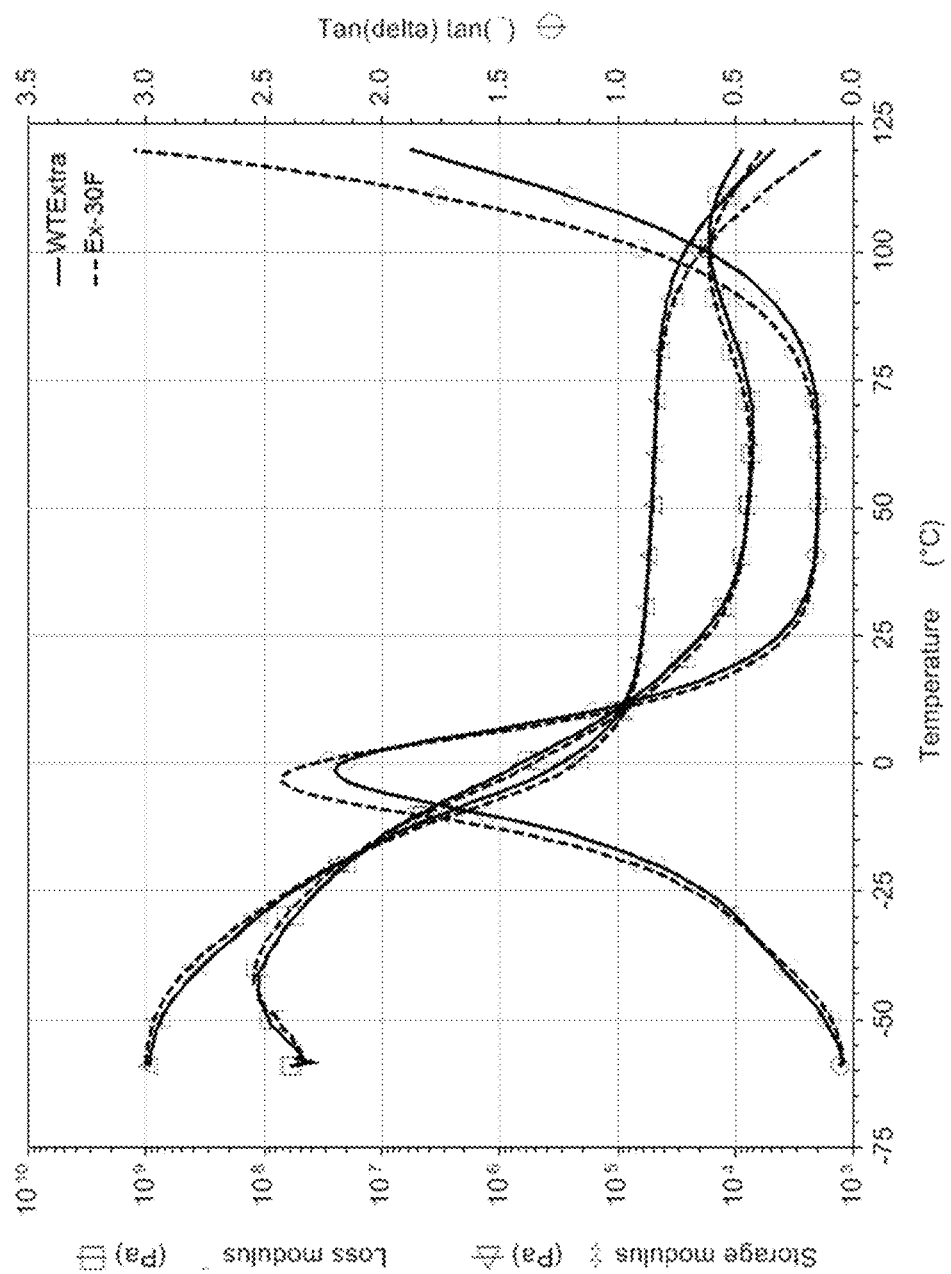
FIG. 15 is a graph of a rheological evaluation comparing of the samples of the adhesive composition according to the fourth embodiment of the present invention and the comparative adhesive composition containing the C5 tackifying resin.
Figure 16:
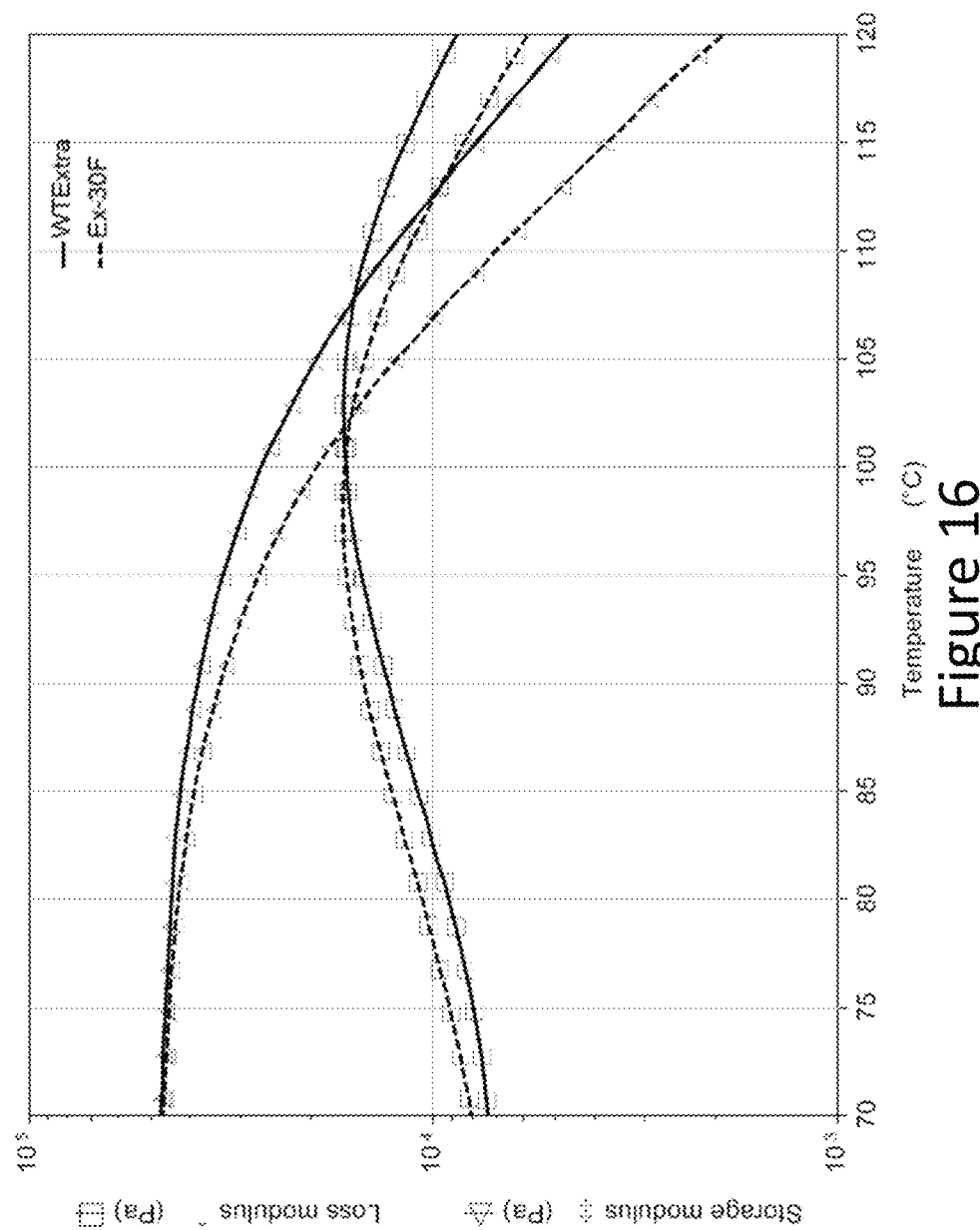
FIG. 16 is a graph of the adhesive moduli using the data from the rheological evaluation of FIG. 15.

Parallel Plate Rheology was determined on the adhesives using a TA Instruments Discovery Hybrid Rheometer 2 and the results illustrated in FIGS. 15 and 16. The Storage and Loss Moduli are nearly identical over the typical temperature range of interest, 0° C. to 70° C. The only significant difference is in the Crossover Temperature. As observed for the adhesives containing farnesene-based resins, the adhesives containing 30% farnesene-C5 resins also have a lower crossover temperature than the control, but the difference has been reduced from 9° C. (for the pure farnesene resin) to 6° C. (for the farnesene-C5 resin).

Figure 14:
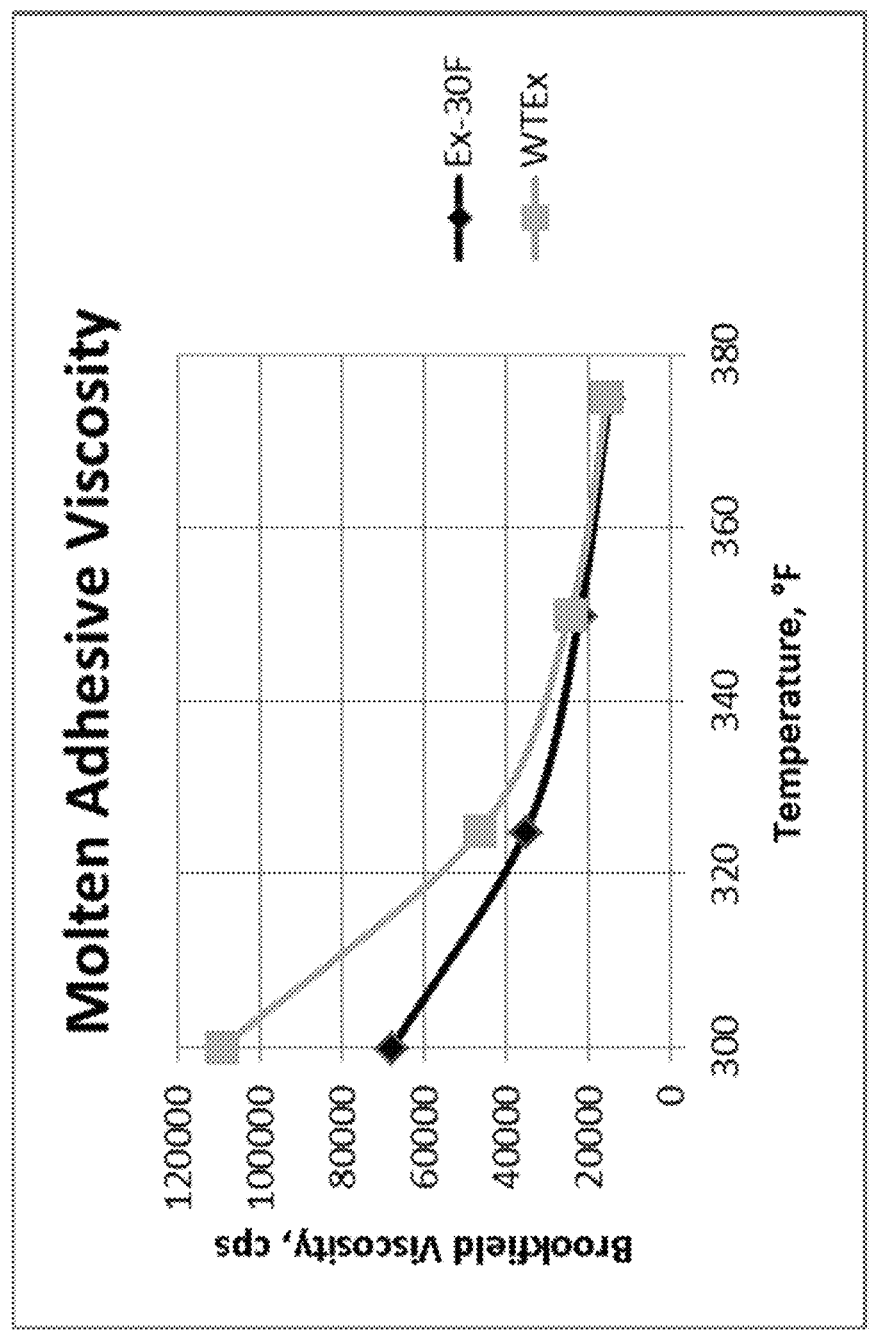
FIG. 14 is a graph comparing the molten adhesive viscosity of one of samples of the adhesive composition according to the fourth embodiment of the present invention and the comparative adhesive composition containing the C5 tackifying resin.

This lower crossover temperature translates to a nearly 40% reduction in the viscosity of the adhesive at 300° F., as provided in FIG. 14. This lower viscosity is observed even though the SAFT is nearly identical to the control.

Thus, the farnesene-extended tackifier resins yielded adhesives with significantly lower viscosity and similar heat resistance, while providing adequate performance when compared to adhesives containing typical commercially available C5 resins.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. An adhesive composition comprising an elastomer and a tackifying resin,
    wherein the tackifying resin is a farnesene polymer derived from monomers comprising farnesene, the farnesene polymer comprising a cyclical structure formed by at least one farnesene monomer bonding to itself, wherein the farnesene monomers are β-farnesene monomers.

2. The adhesive composition of claim 1, wherein the farnesene polymer has a softening point greater than or equal to 80 degrees Celsius.

3. The adhesive composition of claim 1, wherein the farnesene polymer has a number average molecular weight of 400 to 10,000 g/mol.

4. The adhesive composition of claim 1, wherein the elastomer is selected from the group consisting of styrene-isoprene block copolymers, polyacrylate resins, poly ethylene vinyl acetate (EVA) resins, polystyrene butadiene resins, random styrenebutadiene (SBR) copolymers, styrene-butadiene block copolymers, styrene-isoprene-butadiene-styrene (SIBS) copolymers, styrene-ethylene-propylene-styrene (SEPS) copolymers, styrene-ethylene-butylene-styrene (SEBS) block copolymers, amorphous poly-olefin (APO) resins, and mixtures thereof.

5. The adhesive composition of claim 1, wherein the farnesene polymer is prepared by polymerization using $AlCl_3$ at a temperature of about 10 to 60° C.

6. The adhesive composition of claim 1, wherein the farnesene polymer is prepared by polymerization using $BF_3$ at a temperature of about −10 to 50° C.

7. The adhesive composition of claim 1, wherein the farnesene polymer is made according to a method comprising:
    combining a farnesene monomer and a solvent and optionally adding one or more comonomers selected from the group consisting of dienes, branched mono-olefins, and vinyl aromatics, to provide a monomer feed, and
    polymerizing the monomer feed by combining the monomer feed with a Friedel-Crafts catalyst in a vessel.

8. The adhesive composition of claim 7, wherein polymerizing the monomer feed comprises continuously feeding both the monomer feed and the Friedel-Crafts catalyst to the vessel.

9. The adhesive composition of claim 7, wherein the Friedel-Crafts catalyst is selected from the group consisting of $BF_3$, $AlCl_3$, $SnCl_4$, and $TiCl_3$.

10. The adhesive composition of claim 7, wherein the Friedel-Crafts catalyst is at least one of $AlCl_3$ and $BF_3$.

11. The adhesive composition of claim 7, wherein the monomer feed includes 0 to 90 mol. % of the comonomer based on the total moles of monomer.

12. The adhesive composition of claim 7, wherein the monomer feed includes 0 to 40 mol. % of the comonomer based on the total moles of monomer.

13. The adhesive composition of claim 7, wherein the Friedel-Crafts catalyst is AlCl$_3$.

14. An article comprising a substrate and an adhesive composition according to claim 1 applied to at least one surface of the substrate, wherein the substrate is selected from the group consisting of a tape and a label.

15. A coated article comprising the adhesive composition according to claim 1 applied to at least one of wood, a non-woven fabric, and a book-binding.

16. A case and carton assembly line comprising an adhesive station, wherein the adhesive station dispenses an adhesive composition according to claim 1.

17. A farnesene polymer comprising monomeric units derived from a farnesene monomer and one or more comonomers selected from the group consisting of dienes, branched mono-olefins, and vinyl aromatics, wherein the farnesene monomers are β-farnesene monomers, the farnesene polymer comprises a cyclical structure formed by at least one farnesene monomer bonding to itself, the farnesene polymer having a softening point greater than or equal to 80 degrees Celsius, and a number average molecular weight of 400 to 10,000 g/mol, wherein the farnesene polymer acts as a tackifier when compounded with an elastomer.

18. The farnesene polymer of claim 17, wherein the farnesene polymer comprises up to 90 mol % of the comonomer.

19. The farnesene polymer of claim 17, wherein the farnesene polymer comprises up to 40 mol % of the comonomer.

20. The farnesene polymer according to claim 17, wherein the comonomer includes one or more monomers selected from the group consisting of styrene, alpha-methyl styrene, 2-methyl styrene, 3-methyl styrene, 4-methyl styrene, 4-t-butyl styrene, 4-cyclohexyl styrene, 4-dodecyl styrene, 2,4-diisopropyl styrene, 2,4,6-trimethyl styrene, 2-ethyl-4-benzyl styrene, 4-(phenyl butyl)styrene, 1-vinyl naphthalene, 2-vinyl naphthalene, vinyl anthracene, 4-methoxy styrene, monochlorostyrene, dichlorostyrene, divinyl benzene, indene, methyl-indene, butadiene, isoprene, piperylene, myrcene, dipentene, isobutylene, 2-methyl-2-butene, 2-methyl-1-butene, 2-methyl-1-pentene, 2-methyl-2-pentene, 2,3-dimethyl-1-butene, 2,3-dimethyl-2-butene, 3,3-dimethyl-1-butene, and 3-methyl-2-pentene, and isomers thereof.

21. An adhesive composition comprising an elastomer and the farnesene polymer according to claim 17.

22. The adhesive composition according to claim 21, wherein the elastomer is selected from the group consisting of styrene-isoprene block copolymers, polyacrylate resins, poly ethylene vinyl acetate (EVA) resins, polystyrene butadiene resins, random styrenebutadiene (SBR) copolymers, styrene-butadiene block copolymers, styrene-isoprene-butadiene-styrene (SIBS) copolymers, styrene-ethylene-propylene-styrene (SEPS) copolymers, styrene-ethylene-butylene-styrene (SEBS) block copolymers, amorphous poly-olefin (APO) resins, and mixtures thereof.

* * * * *